(12) United States Patent
Hirtz et al.

(10) Patent No.: US 6,331,875 B1
(45) Date of Patent: Dec. 18, 2001

(54) METHOD AND DEVICE FOR ARRANGING DIGITIZED IMAGE SIGNALS OR DATA IN ORTHOGONAL ROWS AND COLUMNS

(75) Inventors: Gangolf Hirtz, Niedereschach; Thomas Hollmann, Bad Dürrheim; Albrecht Rothermel, Neu-ulm; Rainer Schweer, Niedereschach, all of (DE)

(73) Assignee: Deutsch THOMSON-Brandt GmbH, Villingen-Schwennigen (DE)

( * ) Notice: Subject to any disclaimer, the term of this patent is extended or adjusted under 35 U.S.C. 154(b) by 0 days.

(21) Appl. No.: 09/034,913

(22) Filed: Mar. 4, 1998

(30) Foreign Application Priority Data

Mar. 13, 1997 (DE) .............................. 197 10 270

(51) Int. Cl.$^7$ ................................................. H04N 11/00
(52) U.S. Cl. ......................................... 348/497; 500/501
(58) Field of Search ................................ 348/512, 501, 348/497, 498, 572, 573, 575, 499, 536, 537, 538, 513; H04N 7/00, 11/00

(56) References Cited

U.S. PATENT DOCUMENTS

| | | |
|---|---|---|
| 4,062,041 | 12/1977 | Tallent et al. |
| 4,063,284 * | 12/1977 | Tatami .................... 348/497 |
| 4,065,787 * | 12/1977 | Owen et al. .............. 348/497 |
| 4,853,781 * | 8/1989 | Okano et al. ............. 348/497 |
| 5,359,366 * | 10/1994 | Ubukata et al. .......... 348/497 |

FOREIGN PATENT DOCUMENTS

| | | | |
|---|---|---|---|
| 3535311 | 9/1987 | (DE) | ................................ H04N/5/95 |
| 0344856 | 6/1989 | (EP) | ................................ H04N/5/05 |
| 0497416 | 5/1992 | (EP) | ................................ H04N/5/95 |

OTHER PUBLICATIONS

Patent Abstracts of Japan 8–331597A.
Patent Abstracts of Japan 4–48886 A.
Patent Abstracts of Japan 62–188483A.

* cited by examiner

Primary Examiner—Michael Lee
(74) Attorney, Agent, or Firm—J. S. Tripoli; R. D. Shedd; D. T. Shoneman

(57) ABSTRACT

Television receivers are increasingly making use of digital signal processing. Present-day television receivers use a line-coupled clock system in this case, since this produces an orthogonal pixel array for signal processing on the picture screen. The disadvantage of such a clock grid resides in its problematical generation, in particular when video recorders are used as signal source.

According to the invention, video signals are digitized and processed by means of a free-wheeling system clock made from a quartz oscillator. In order not to have to use large buffer memories, the vertical deflection is synchronized with the input signal, but the number of lines per field or frame is varied.

23 Claims, 1 Drawing Sheet

METHOD AND DEVICE FOR ARRANGING DIGITIZED IMAGE SIGNALS OR DATA IN ORTHOGONAL ROWS AND COLUMNS

The invention relates to a method and a device for arranging digitized image signals or data, which do not necessarily have a constant time base, in orthogonal rows and columns with a constant time base.

BACKGROUND OF THE INVENTION

Television receivers are increasingly making use of digital signal processing, for example for 100 Hz or 120 Hz reproduction. For this purpose, the analogue video signals are digitized using an A/D converter, digitally processed and thereafter reconverted, using a D/A converter, into analogue signals which are represented on a picture screen.

Present-day television receivers use a line-coupled clock system as clock for the A/D and D/A converters, since this produces an orthogonal pixel array for signal processing on the picture screen. The disadvantage of such a clock grid resides in its problematical generation, in particular whenever video recorders are used as signal source, because they emit unstable or non-standard signals.

SUMMARY OF THE INVENTION

The object of the invention is to specify a method for an arrangement or representation of image signals or data which is essentially on a constant time base and in which such clock problems are avoided. This object is achieved by means of the method specified herein.

It is further the object of the invention to specify a device for applying the method according to the invention. This object is achieved by means of the device specified herein.

It is further the object of the invention to specify a television receiver for applying the method according to the invention. This object is achieved by means of the television receiver specified in herein.

According to the invention, video signals which are unstable, at least as to their time base, in particular video signals which originate from a video recorder or comparable sources of image signals, are digitized by means of a free-wheeling clock from a quartz oscillator in the A/D converter(s) at the input end. The free-wheeling clock represents the system clock by means of which, or in a fashion derived from which, the digital signal processing which then follows is also operated, including possible D/A conversion at the image signal, sound signal, data and/or address or deflecting outputs of the digital signal processing system.

Video signals which are standard or stable as to their time base can, however, also be processed using this method. It is, however, advantageous for the video signals governed by this system clock likewise to be present in an orthogonal, line-coupled array. The horizontal deflection of the television receiver can also advantageously be synchronized with the system clock or the corresponding clock derived therefrom, with the result that, for example, 1152 system clock pulses (in the case of an 18 MHz system clock)always supply 1152 pixels in each of the lines. The associated pixels of an imaginary input signal pixel column are then situated exactly one below another when represented on the display.

However, in general a frequency deviation occurs between the horizontal frequency of the video signal from the video recorder and the horizontal frequency of the television receiver. Nevertheless, the horizontal deflection of the television receiver must no longer be synchronized with the input signal. The horizontal deflection of the television receiver should, certainly, run synchronously with the corresponding internal clock, but the picture-tube deflection or display addressing and the system clock must in principle no longer be synchronous relative to the television receiver input signal.

In order not to have to use theoretically infinitely large buffer memories, the vertical deflection or vertical addressing is synchronized with the input signal. The contradiction thereby arising that, on the one hand, the deflection or display addressing should be asynchronous relative to the input signal but, on the other hand, should be synchronous on average relative thereto is eliminated according to the invention by operating the picture tube or the display with a variable picture frequency or vertical frequency, but with an invariable line frequency. The horizontal frequency no longer has a fixed relationship to that of the input signal; the vertical frequency, however, follows that of the television receiver input signal.

The standard fixed relationship between the vertical and horizontal frequency or deflection in the television receiver is no longer continuously present. The number of lines reproduced per field can fluctuate and will also do so in the case of video recorder signals.

A distinction must be drawn between the number of lines per time unit (corresponds to the line frequency) and the number of lines per field or per frame. The line frequency, that is to say the line duration of 64 $\mu$s (active line duration 52 $\mu$s) in the case of a 625 line/50 Hz television signal standard, is preferably constant in the invention, while the number of lines per field or per frame is dynamically matched.

Experiments have shown that at least some television receivers on the market (for example those manufactured by Thomson) are best suited for this operation using variable line numbers, by contrast with, for example, studio monitors.

The great advantage of this invention results in that it is no longer necessary for the many phase-locked loops of a television receiver (for example as used in synchronization pulse separation and the conditioning, in the generation of line pulses or in deflection, in the PLL for clock pulse generation) also to be designed for satisfactory operation of the television receiver with a video recorder, or to design them for input signals which are variable as to the time base. This renders it possible to develop new, more highly integrated television receiver chassis, which can therefore be produced more cost effectively.

In principle, the method according to the invention serves the purpose of arranging digitized image signals or data, which contain parts suitable for synchronization and do not necessarily have a constant time base, in orthogonal rows and columns, the number of lines per field or frame and/or of pixels per line that is used for an arrangement or representation of the image signals or data on an essentially constant time base being matched to the corresponding original number of image signals or data so as in each case to produce within a limited time interval a synchronization of the image signals or data provided for the representation with the original image signals or original data.

Advantageous developments of the method according to the invention follow from the associated dependent claims.

In principle, the device according to the invention serves the purpose of arranging digitized image signals or data, which contain parts suitable for synchronization and do not necessarily have a constant time base, in orthogonal rows and columns with an essentially constant time base, and is provided with:

first means which compare the synchronization parts with a first clock, which can be based on a system clock and which can also be the system clock;

second means, which arrange or represent the image signals or data with an essentially constant time base by means of a second clock, which is based on the system clock and can also be the system clock, specifically with a number of lines per field or frame and/or of pixels per line which is such, by comparison with the corresponding original number of image signals or data, that the image signals or data provided for the representation are synchronized with the original image signals or image data by means of the comparison in the first means inside a limited time interval in each case.

In principle, the television receiver according to the invention arranges digitized image signals, which do not necessarily have a constant time base, in orthogonal rows and columns with an essentially constant time base, and is provided with:

first means, which compare the synchronization signals contained in the image signals with a first clock, which can be based on a system clock and can also be the system clock;

second means, which represent the image signals with an essentially constant time base by means of a second clock, which is based on the system clock and can also be the system clock, specifically with a number of lines per field or frame which is such, by comparison with the original number of lines of the image signals, that the image signals provided for the representation are synchronized with the original image signals by means of the comparison in the first means inside an image in each case.

DRAWINGS

Exemplary embodiments of the invention are described with the aid of the drawings, in which.

DETAILED DESCRIPTION OF THE INVENTION

Figure 1:
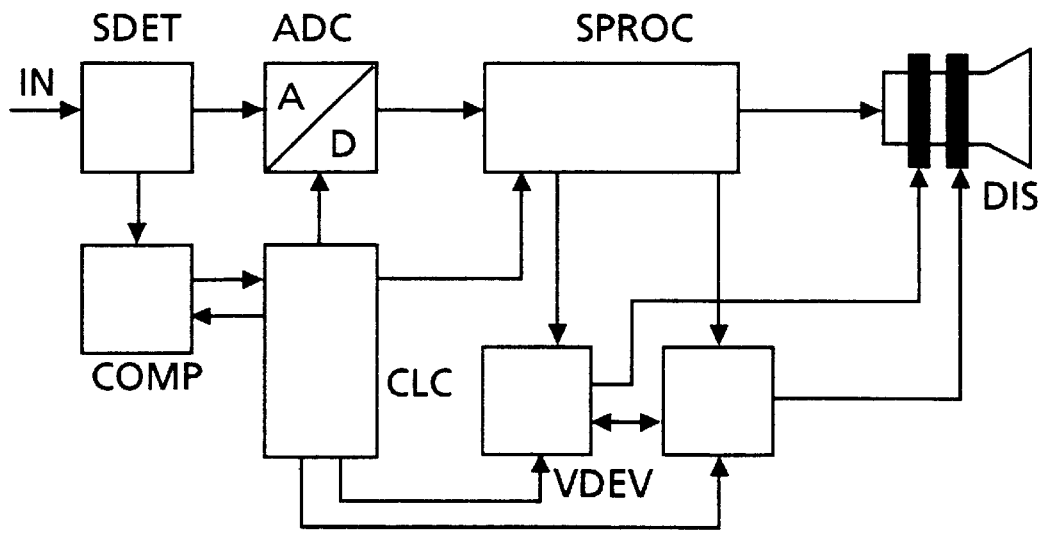
FIG. 1 shows a block diagram for a television receiver.

In FIG. 1, the input signals IN, in particular video signals, at the input end, which are possibly unstable in terms of their time base, are fed via a synchronization signal detector SDET to an A/D converter ADC, in which they are digitized or sampled by means of a free-wheeling clock, for example stabilized by means of a quartz oscillator. Audio or data signals can already be separated from the video signal IN and therefore do not need to be guided via the SDET. They can be digitized in separate A/D converters. The video signal IN can also, for example, be present in component form, the number of the associated A/D converters being capable of corresponding to the number of the components, and, for example, only the luminance component being guided via the SDET.

The free-wheeling clock constitutes the system clock or is derived from it and originates from clock generator means CLC, which also supply the modules described below, for example also a display DIS, with the system clock or the required clock pulses respectively derived therefrom. The synchronization information obtained in the SDET is compared in a comparator COMP to the system clock or the required clock derived therefrom, that is to say with the internal horizontal frequency and vertical frequency or the clock information belonging thereto.

The A/D converter ADC can also be fed directly from the input signal IN, the SDET and/or the COMP being arranged behind the ADC and operating accordingly in the digital plane.

The required processing, decoding or demodulation of the digitized input signals IN take place in signal processor means SPROC downstream of the ADC. The SPROC relays the luminance and/or chrominance output signals to a picture tube DIS or to a display. The values of the pixels of the video signals are processed in the SPROC in such a way that these pixels form an orthogonal, line-coupled array or a corresponding matrix.

The vertical deflecting or addressing means VDEV and the horizontal deflecting or addressing means HDEV are triggered by the SPROC or by the CLC and, for their part, drive corresponding deflecting coils of the picture tubes or corresponding address inputs of the display DIS. The HDEV is driven in such a way that each of the lines represented contains an equal number of pixels.

The vertical deflection or addressing is synchronized with the input signal by means of the SDET, COMP, CLC and/or SPROC. In this case a relatively small buffer memory can be used in SPROC. The respective line number per field or frame is varied so as to achieve a synchronism of the input signal IN and the signal represented on the DIS over a somewhat longer term. This synchronism is preferably achieved in the case of each vertical flyback. The permissible, temporal fluctuations between the input signal IN and the representation on the display DIS determine the size of this buffer memory.

The result of the comparison in the COMP is fed directly or via the CLC to the circuits VDEV and SPROC. The drive for the number of lines to be represented per picture is varied correspondingly in the VDEV. In the SPROC, the assignment of the data to the lines to be represented is matched correspondingly, that is to say the output of the pixel values for lines not to be represented is suppressed.

Appropriate D/A converters can be arranged at the outputs of the SPROC, VDEV and HDEV, said converters being driven by the system clock or the required clocks respectively derived therefrom.

The vertical deflecting or addressing means VDEV are advantageously reset by the V synchronization pulse of the input signal IN, being triggered, however, not immediately but only synchronously with the horizontal deflecting or addressing means HDEV. An acceptable line-scanning pattern (without pairing) can thereby be achieved on the picture screen.

Figure 2:
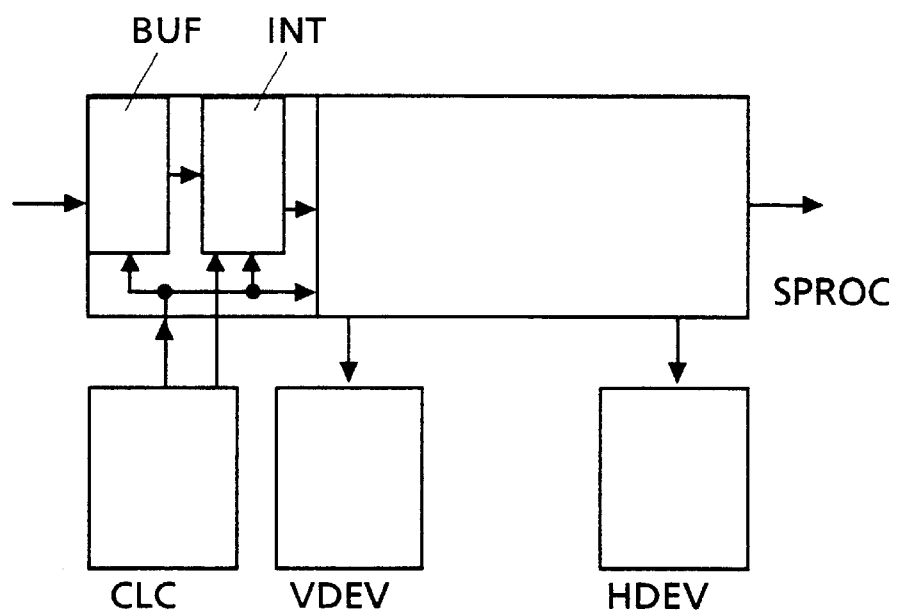
FIG. 2 shows a more detailed block diagram for the signal processor SPROC for calculating interpolated pixel values.

Depending on the level of the clock frequency used in the ADC, and on the time base fluctuations in the input signal IN, the temporal position of the pixel samples can deviate from the target temporal position in the orthogonal array. In order to avoid the use of "false" pixel values for the orthogonal array, the video input data digitized in the ADC are not further processed immediately in the SPROC, but, as shown in FIG. 2, are firstly entered in SPROC into a buffer BUF, from where they are fed into the SPROC via interpolator means INT of the further signal processing system. The coefficient set respectively to be used in the INT for the interpolation is, for example, selected by the CLC as a function of the respective temporal position of the pixel value relative to the orthogonal array.

The input signals IN can also be digital signals which, for example, are arranged in data frames or data packets. In this case, it is possible, for example, for the number of the evaluated or represented data packet contents per relatively large data frame—with which synchronization is performed—to be variable. The data can, for example, originate from the internet or similar data sources.

Instead of a television receiver, the receiving device can also be any other device, for example a digital video recorder or a PC monitor, which arranges or represents data at the output end in the form in each case of a matrix of rows and columns.

Conversely, the number of lines per field or frame can also be invariable, whereas the number of pixels per line can fluctuate. In this case, there is an appropriate change in the driving of the HDEV and VDEV.

It is also possible for both values to be variable or for one of the values to be alternately invariable in each case, depending on the respective type of the input signals or data IN, on the respective type of the representation, or on the respective type of the receiving conditions or relationships.

It is also possible for the number of lines per field or frame and the number of pixels per line to be fixed to be invariable in principle, but to vary the lengths of the horizontal and/or vertical blanking intervals correspondingly.

What is claimed is:

1. A method for processing original picture signal data having signal portions suitable for synchronization, said original picture signal data further having a non-constant time base, comprising:

receiving said original picture signal data;

generating lines of picture signal data having a constant line duration from said original picture signal data; and generating, using said original picture signal data synchronization portions, pictures from said lines of said picture signal data, of which pictures the number of lines per field or lines per frame is variable so as to adapt to said non-constant time base.

2. The method according to claim 1, wherein said step of generating said pictures further comprises varying the number of lines per field or lines per frame to synchronize said generated pictures with said original picture signal data over a limited time interval.

3. The method according to claim 1, further comprising the step of sampling said original picture signal data according to a first clock.

4. The method according to claim 3, wherein said step of generating said pictures uses a second clock, and wherein said first and second clocks are both based on a common system clock.

5. The method according to claim 1, wherein said original picture signal data represent a television signal, and wherein said generating step further comprises resetting a related vertical deflection or addressing via a related vertical synchronization pulse triggered synchronously with a related horizontal deflection or addressing.

6. The method according to claim 1, wherein the step of generating said lines of picture signal data includes forming an equal number of pixels in each of said generated lines.

7. The method according to claim 1, further comprising interpolating pixel values from said original picture signal data for said generated pictures.

8. The method according to claim 7, wherein the step of interpolating further comprises selecting a coefficient set via a clock as a function of the respective temporal position of the pixel values.

9. The method according to claim 1, further comprising formatting said original picture signal data in data packets, and excluding a corresponding number of data packets per picture from said generated pictures so as to adapt to said non-constant time base.

10. A method for processing original picture signal data having signal portions suitable for synchronization, said original picture signal data further having a non-constant time base, comprising:

receiving said original picture signal data;

generating using said original picture signal data synchronization portions, lines of picture signal data having a variable number of pixels per line so as to adapt to said non-constant time base; and generating pictures from said picture signal lines, of which pictures the number of lines per field or lines per frame is constant.

11. The method according to claim 10, wherein said step of generating said pictures is carried out such that in each case said generated pictures are synchronized with said original picture data over a limited time interval.

12. The method according to claim 10, further comprising the step of sampling said original picture signal data according to a first clock.

13. The method according to claim 10, wherein said step of generating said pictures uses a second clock, and wherein said first and second clocks are both based on a common system clock.

14. The method according to claim 10, further comprising interpolating pixel values from said original picture signal data for said generated pictures.

15. The method according to claim 10, wherein said original picture signal data represent a television signal, and wherein said generating step further comprises resetting a related vertical deflection or addressing via a related vertical synchronization pulse triggered synchronously with a related horizontal deflection or addressing.

16. The method according to claim 10, further comprising formatting said original picture signal data in data packets, and excluding a corresponding number of data packets per picture from said generated pictures so as to adapt to said non-constant time base.

17. A method for processing original picture signal data having signal portions suitable for synchronization, said original picture signal data further having a non-constant time base, comprising:

receiving said original picture signal data;

generating lines of picture signal data having a constant line duration from said original picture signal data; and generating pictures from said lines of said picture signal data, said pictures having a constant number of lines per field or number of lines per frame and varying horizontal or vertical blanking interval lengths so as to adapt to said non-constant time base.

18. The method according to claim 17, further comprising formatting said original picture signal data in data packets, and excluding a corresponding number of data packets per picture from said generated pictures so as to adapt to said non-constant time base.

19. A device for processing original picture signal data having signal portions suitable for synchronization, said original picture signal data further having a non-constant time base, comprising:

means for generating from said original picture signal data, lines of picture signal data having a constant line duration; and second means responsive to said synchronization signal portions for generating pictures from said lines of said picture signal data, said pictures having a variable number of lines per field or lines per frame so as to adapt to said non-constant time base.

20. A method of processing original picture signal data having a non-constant time base and signal portions suitable for synchronization to provide a representation of said original picture data on a display, comprising:

receiving said original picture signal data;

processing said original picture signal data in accordance with a system clock to form a digitized representation of said original picture signal data; and applying at the display a line frequency having a constant time base and a varying picture frequency to said digitized representation, said varying picture frequency adaptable to said non-constant time base of said original picture signal in accordance with said system clock.

21. A method for processing original picture signal data having signal portions suitable for synchronization, said original picture signal data further having a non-constant time base, comprising:

receiving said original picture signal data;

generating lines of picture signal data having a constant line duration from said original picture signal data; and generating, using said original picture signal data synchronization portions, pictures from said lines of said picture signal data, of which pictures the number of lines per field or lines per frame is variable so as to adapt to said non-constant time base, wherein said generating step includes resetting a related vertical deflection or addressing via a related vertical synchronization pulse triggered synchronously with a related horizontal deflection or addressing.

22. A method for processing original picture signal data having signal portions suitable for synchronization, said original picture signal data further having a non-constant time base, comprising:

receiving said original picture signal data;

interpolating pixel values from said original picture signal data;

generating lines of picture signal data having a constant line duration from said original picture signal data; and generating, using said original picture signal data synchronization portions and said interpolated pixel values, pictures from said lines of said picture signal data, of which pictures the number of lines per field or lines per frame is variable so as to adapt to said non-constant time base.

23. A method for processing original picture signal data having signal portions suitable for synchronization, said original picture signal data further having a non-constant time base, comprising:

receiving said original picture signal data;

formatting said original picture signal data in data packets;

generating lines of picture signal data having a constant line duration from said original picture signal data; and generating, using said original picture signal data synchronization portions, pictures from said lines of said picture signal data, of which pictures the number of lines per field or lines per frame is variable so as to adapt to said non-constant time base, wherein a corresponding number of data packets per picture is excluded from said generated pictures so as to adapt to said non-constant time base.

* * * * *